No. 721,184. PATENTED FEB. 24, 1903.
E. C. HARVEY.
MEANS FOR AERATING BEER OR OTHER FLUIDS.
APPLICATION FILED JUNE 16, 1902.
NO MODEL. 2 SHEETS—SHEET 1.
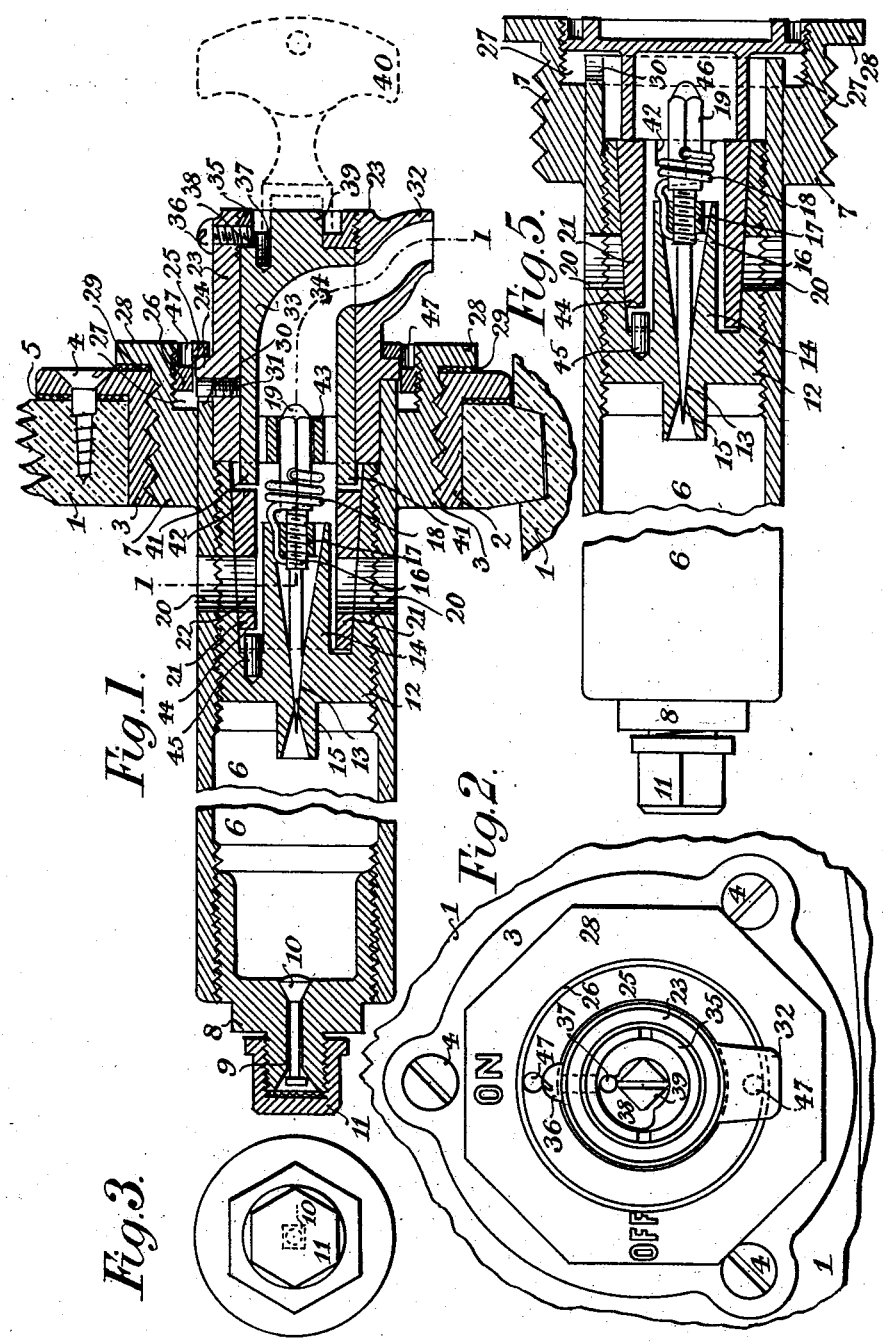
Witnesses:
C. H. White
E. Holmes.
Inventor:
Edward Charles Harvey
By Whitewoodington
Attorneys No. 721,184. PATENTED FEB. 24, 1903.
E. C. HARVEY.
MEANS FOR AERATING BEER OR OTHER FLUIDS.
APPLICATION FILED JUNE 16, 1902.
NO MODEL. 2 SHEETS—SHEET 2.
*Fig. 4.*
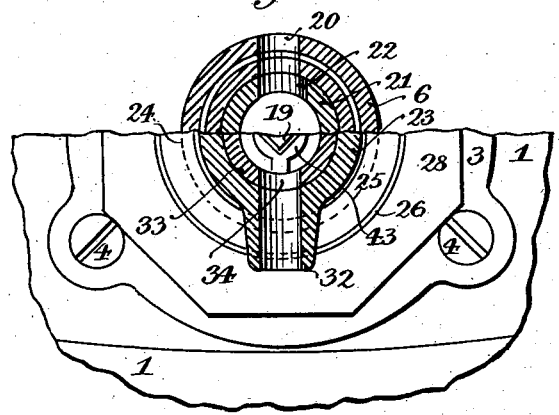
*Fig. 8.*     *Fig. 6.*     *Fig. 7.*
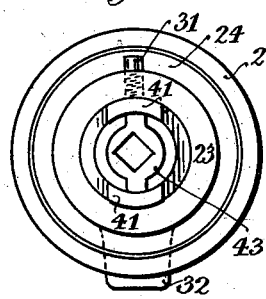 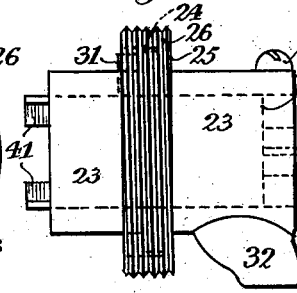 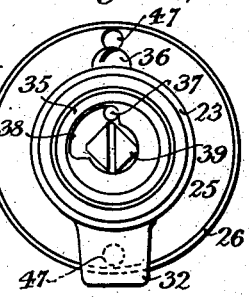
*Fig. 11.*     *Fig. 9.*     *Fig. 10.*
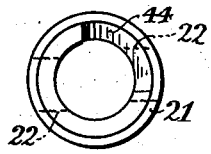 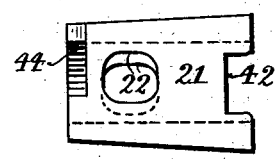 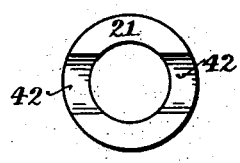
Witnesses:     Inventor:
                           Edward Charles Harvey
                           By
                           Attorneys

United States Patent Office.

EDWARD CHARLES HARVEY, OF LONDON, ENGLAND.

MEANS FOR AERATING BEER OR OTHER FLUIDS.

SPECIFICATION forming part of Letters Patent No. 721,184, dated February 24, 1903.

Application filed June 16, 1902. Serial No. 111,947. (No model.)

*To all whom it may concern:*

Be it known that I, EDWARD CHARLES HARVEY, gentleman, a subject of the King of Great Britain, residing at 59 Mark Lane, in the city of London, England, have invented certain new and useful Improvements in or Connected with Means for Aerating Beer or other Fluids, of which the following is a specification, reference being had to the accompanying drawings and to the reference-numerals marked thereon.

The invention relates to improvements in or connected with means for aerating beer or other fluid; and the object thereof is to impregnate with carbonic-acid gas the fluid, and more especially beer, as it is drawn from a cask or other vessel, so that it may always be in a sparkling condition and have a suitable head.

In the accompanying drawings, Figure 1 is a vertical longitudinal section of an apparatus constructed according to the present invention, showing the same placed in position in a cask and with the tap turned on. Fig. 2 is a front elevation thereof. Fig. 3 is a rear elevation thereof. Fig. 4 is a vertical transverse section taken on the line 1 1 of Fig. 1. Fig. 5 is a similar view to Fig. 1, but partly in elevation and showing the apparatus separate from the cask and with the tap removed. Fig. 6 is a side elevation of the tap separately. Fig. 7 is a front elevation thereof. Fig. 8 is a rear elevation thereof. Fig. 9 is a side elevation of the plug or valve separately. Fig. 10 is a front elevation thereof, and Fig. 11 is a rear elevation thereof.

In the several figures like parts are indicated by similar reference-numerals.

1 represents a beer or other cask, or it might be any other suitable vessel, and 6 represents a long cylindrical chamber or reservoir which occupies a position in the interior of the vessel 1 and is preferably of a diameter to pass easily through the ordinary tap-hole 2 of the cask 1.

The tap-hole 2 of the cask 1 is lined with an interiorly-threaded bush 3, which is fixed to the cask by screws 4, and the cylinder 6 is at its outer end provided with an exteriorly and correspondingly threaded collar or fitting 7, which is fixed therewith by brazing or otherwise and screws into the bush 3, and by the aid of a ring of packing 5 a tight joint is made between the parts.

The cylinder 6 is transversely but unequally divided into two compartments by means of a partition 12, placed near to the outer end thereof, and the inner end of the cylinder 6 is closed by a stopper 8, having an axial perforation 9 therethrough fitted with a non-return valve 10 and through which the larger compartment of the cylinder 6 may be filled with carbonic-acid gas prior to the insertion of the cylinder 6 in the cask 1, while a cap 11, screwing onto the stopper 8, seals said perforation 9.

The partition 12 is provided with a way or perforation 13 for the passage of the gas from the larger chamber into the smaller one, and connected with said gasway 13 is provided a vena contracta or like device 14, within which is fitted a needle-valve 15, which closes the gasway 13.

The stem of the needle-valve 15 is formed with a screw-thread 16 thereon, which works in a nut 17, fixed with the vena contracta 14, and the valve 15 is kept to its seat by a helical spring 18, one end of which is fixed with the nut 17 and the other end with the stem of the valve 15, and the spring 18 exerts a force to turn the stem of the valve 15 and by means of the screw 16 and nut 17 force the valve to its seat.

The cylinder 6 is provided with lateral openings 20 adjacent to the vena contracta 14 and controlled by a hollow conical plug-valve 21, fitting closely within an extension of the partition 12 and formed with perforations 22, adapted to coincide, as shown at Fig. 1, with those, 20, of the cylinder 6, and so place the smaller chamber in communication with the contents of the cask 1, so that the gas issuing from the inner or larger chamber and passing through the vena contracta 14 will draw in the beer or other contents of the cask at the perforations 20 and 22 and carry it through the smaller or outer chamber and away by the tap hereinafter described and at the same time effectually aerate said liquid.

Into the outer end of the cylinder 6 is fitted a tap consisting of a cylindrical case 23, which fits into the outer end of the cylinder 6 and is provided with a flange 24, with which engages the flange 25 of a collar or union 26, which is exteriorly threaded to screw into an interiorly-threaded recess 27, formed in the outer face of the fitting 7, and the union 26 is in its face provided with holes 47, adapted to receive a key, by the aid of which it may be screwed into position, and the fitting 7 is provided with a flange 28 and a ring of packing 29, by the aid of which a tight joint is made with the bush 3.

In order that the tap may always be correctly inserted in the cylinder 6, the latter is formed with a notch 30 in its end, and the cylindrical case 23 of the tap is provided with a coacting pin 31, which engages said notch.

The fixed cylindrical casing 23 is provided with a spout 32, and revolubly fitting the casing 23 is a hollow inner cylinder 33, which is provided with a way 34, adapted to register with the spout 32 of the case 23, as shown at Fig. 1, and said inner cylinder 33 is secured in position by a nut 35, fixed against revolution by a set-screw 36, while the rotary movement of the inner cylinder 33 is limited by a stop-pin 37, fixed in the outer end thereof and which works in a notch 38 in the nut 35.

The outer end of the inner cylinder 33 is formed with a square 39 to receive a removable key 40, by the aid of which it may be turned, and the inner end thereof is provided with studs or projections 41, which engage coacting notches 42 in the plug or valve 21, so that the revoluble movement given to the inner cylinder 33 in order to turn the tap on brings the way 34 into coincidence with the spout 32 and the way 22 of the plug 21 into alinement with the way 20 of the cylinder 6 and permits the contents of the cask 1 to flow therethrough.

The inner cylinder 33 is interiorly provided with a fitting 43, having a square hole therethrough which loosely receives the square end 19 of the stem of the needle-valve, and thus the partial rotation given to the inner cylinder 33 to turn the tap on also turns the stem of the needle-valve 15 against the force of the spring 18 and by the screw 16 working in the nut 17 proportionately retracts the needle-valve 15 from its seat, and thus permits a suitable volume of carbonic-acid gas to rush through the vena contracta 14 and force and draw with it the fluid entering by the way 20, which emerges from the spout 32 in a sparkling condition.

The reverse movement of the inner cylinder 33 shuts off the ways 22 and 34 and screws the needle-valve 15 again to its seat, and by reason of the loose fit of the square 19 on the fitting 43 and the torsional force of the spring 18 the early and complete closure of the needle-valve 15 is insured.

In order to facilitate the placing of the plug or valve 21 in correct relative position to the way 20 in the cylinder 6 and to arrest its movement in either of its extreme positions, a recess or notch 44 is formed in one end thereof, and a stop-pin 45, fixed with the partition 12, is employed to act in conjunction with said notch.

The cylinders 6, charged with gas, may be inserted into the casks or other vessels prior or subsequently to the latter being filled with beer or other fluid, and they may be readily withdrawn from the cask or the like to admit of both being effectually cleansed and the cylinder 6 recharged with carbonic-acid gas. The tap 23 may also be readily fixed in position in the cylinder 6 or removed when the latter is in position in the vessel 1, and in order to close the end of the cylinder 6 when the tap is removed a plug 46 is employed, which screws into the fitting 7 in place of the union 26 and takes a bearing against the end of the plug or valve 21, thereby serving to retain the same in position.

By the means hereinbefore described the beer or other fluid drawn from the cask or other vessel will always be in good condition and any appearance of flatness will be avoided.

It will be obvious that the details of construction of the device may be modified without departing from the spirit of the invention.

Having now particularly described and ascertained the nature of the said invention and in what manner the same is to be performed, I declare that what I claim is—

1. In means for aerating fluid contained in a cask or other vessel, a long cylinder adapted to be inserted through a bung or like hole in the vessel, means for removably fixing the cylinder with the vessel, a partition across the cylinder near to the outer end thereof dividing the cylinder into inner and outer chambers, a valve-controlled filling-orifice for carbonic-acid gas at the inner end of the cylinder, a gasway through the partition terminating in a vena contracta or like device, a needle-valve for closing said gasway, lateral ways in the cylinder in front of the partition for the admission of fluid from the cask or other vessel to the outer chamber, a tap connecting with the outer chamber, means for holding the needle-valve to its seat and means connecting the needle-valve with the tap so that the turning on of the latter also opens said valve substantially as herein shown and described and for the purpose stated.

2. In means for aerating fluid contained in a cask or other vessel, a long cylinder adapted to be inserted through a bung or like hole in the vessel, means for removably fixing the cylinder with the vessel, a partition across the cylinder near to the outer end thereof dividing the cylinder into inner and outer chambers, a valve-controlled filling-orifice for carbonic-acid gas at the inner end of the cylinder, a gasway through the partition controlled by a valve, lateral ways in the cylinder in front of the partition for the admission of fluid to the outer chamber, a tap connecting with the outer chamber and means connecting the valve of the gasway with the tap so that the turning on of the latter also opens said valve substantially as herein shown and described and for the purpose stated.

3. In means for aerating fluid contained in a cask or other vessel, a long cylinder adapted to be inserted through a bung or like hole in the vessel, means for removably fixing the cylinder with the vessel, a partition across the cylinder near to the outer end thereof dividing the cylinder into inner and outer chambers, a valve-controlled filling-orifice for carbonic-acid gas at the inner end of the cylinder, a gasway through the partition terminating in a vena contracta or like device, a needle-valve for closing said gasway, lateral ways in the cylinder in front of the partition for the admission of fluid from the cask or other vessel to the outer chamber, a hollow plug or valve working within an extension of the partition said plug and extension being perforated to correspond with the cylinder, a tap connecting with the outer chamber and consisting of a fixed cylindrical case and an inner revoluble cylinder which engages the plug or valve so as to give motion thereto, a nut carried by the vena contracta, a coacting screw upon the stem of the needle-valve, a square head upon the end of the needle-valve stem, a coacting but loosely-fitting square sleeve within the inner cylinder of the tap and a torsional spring coiled around the needle-valve stem and by one end fixed to the nut and by the other end fixed to the stem and tending to turn the valve-stem in the nut and thus force the valve to its seat substantially as herein shown and described and for the purpose stated.

EDWARD CHARLES HARVEY.

Witnesses:
C. MELBOURNE WHITE,
C. H. WHITE.